(12) United States Patent
Martin et al.

(10) Patent No.: US 8,307,074 B1
(45) Date of Patent: Nov. 6, 2012

(54) SELF-SELECTED MESSAGE QUEUE MONITORING

(75) Inventors: Justin A. Martin, Olathe, KS (US); Edward A. Mlodzik, Shawnee, KS (US); Brian J. Washburn, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 242 days.

(21) Appl. No.: 12/837,081

(22) Filed: Jul. 15, 2010

(51) Int. Cl.
*G06F 15/173* (2006.01)

(52) U.S. Cl. .................. 709/224; 709/206; 709/207

(58) Field of Classification Search .......... 709/224, 709/223, 226, 204–207; 370/242–253; 714/39, 714/47.1, 47.2, 47.3
See application file for complete search history.

(56) References Cited

U.S. PATENT DOCUMENTS

| | | | |
|---|---|---|---|
| 6,765,873 B1 * | 7/2004 | Fichou et al. | 370/235 |
| 7,127,507 B1 * | 10/2006 | Clark et al. | 709/224 |
| 7,369,967 B1 | 5/2008 | Washburn et al. | |
| 7,460,874 B1 * | 12/2008 | Hou et al. | 455/466 |
| 7,467,388 B2 * | 12/2008 | Driver et al. | 719/314 |
| 7,634,542 B1 * | 12/2009 | Krause et al. | 709/206 |
| 7,721,300 B2 * | 5/2010 | Tipton et al. | 719/321 |
| 2010/0125665 A1 | 5/2010 | Simpson et al. | |

OTHER PUBLICATIONS

Anonymous, "Message queue", Jan. 22, 2010, http://web.archive.org/web/20100122190957/http://en.wikipedia.org/wiki/Message_queue.

* cited by examiner

*Primary Examiner* — Wing Chan
*Assistant Examiner* — Ruolei Zong

(57) ABSTRACT

A self-selected message queue monitoring system is provided. The system comprises a processor, a memory, and an application stored in the memory that, when executed by the processor, presents an interface to a requester enabling self-registration for selection of monitoring of at least one message queue of a plurality of message queues associated with a plurality of user applications. The system also receives a message completing self-registration for monitoring, the message selecting monitoring of a first message queue associated with a first user application. The system also authorizes the requester to access periodically collected information about the first message queue. The system also determines, at a predetermined time, a first metric associated with the first message queue wherein the first metric is specified in the message completing self-registration, and stores the first metric for access by the requester.

19 Claims, 4 Drawing Sheets

SELF-SELECTED MESSAGE QUEUE MONITORING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Message queuing may be used for the intake, storage, and forwarding of messages transmitted within and between applications executing on one or more computers. Some message queues function internally, within a single instance of an operating system or application. Other implementations of message queuing pass messages between a plurality of computers and may involve multiple applications. When messages are passed between applications, message queuing software stores the incoming messages until the target or recipient application connects with the message queuing server. A registered software routine may be called and the stored messages then may be released to the recipient application for its processing. Considerations impacting the use and configuration of messaging queuing software include how messages are to be stored to assure durability, for example in memory, on disk, or in a database. Additional considerations comprise determining the duration of message storage, the guaranteeing of message delivery, and the routing of messages when a plurality of message queue servers may be in operation. Security issues also may prescribe that certain applications may receive access to some messages while other applications are denied such access.

SUMMARY

In an embodiment, a self-selected message queue monitoring system is provided. The system comprises a processor, a memory, and an application stored in the memory that, when executed by the processor, presents an interface to a requester enabling self-registration for selection of monitoring of at least one message queue of a plurality of message queues associated with a plurality of user applications. The system also receives a message completing self-registration for monitoring, the message selecting monitoring of a first message queue associated with a first user application. The system also authorizes the requester to access periodically collected information about the first message queue. The system also determines, at a predetermined time, a first metric associated with the first message queue wherein the first metric is specified in the message completing self-registration, and stores the first metric for access by the requester.

In an embodiment, a processor-implemented method of queue monitoring is provided comprising a monitoring server receiving a request from a requester to monitor a first message queue associated with at least one of a first application wherein the first message queue is further associated with a first message queue server. The method also comprises the monitoring server approving the request and the monitoring server creating a table in a database wherein the table stores information generated in connection with the monitoring of the first message queue. The method also comprises the monitoring server creating a configuration file associated with the request, the configuration file designating the first message queue server and the first message queue. The method also comprises the first message queue server periodically generating information about the first message queue in response to the request described in the configuration file. The method also comprises the first message queue server providing the periodically generated information to the monitoring server and the requester accessing the periodically generated information.

In an embodiment, a processor-implemented method of queue monitoring is provided comprising a monitoring server receiving a request from a requester to monitor a first message queue associated with at least one of a first application wherein the first message queue is further associated with a first message queue server. The method also comprises the monitoring server approving the request wherein the request further directs that notification be sent to the requester when a first metric associated with the first message queue one of exceeds and falls below a first threshold. The method also comprises the first message queue server retrieving a configuration file from the monitoring server and commencing monitoring associated with the request, wherein the request is described in the configuration file. The method also comprises the first message queue server detecting during monitoring of the first message queue that the first metric one of exceeded and fell below the first threshold and notifying the monitoring server. The method also comprises the monitoring server transmitting notification that the first metric one of exceeded and fell below the first threshold.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
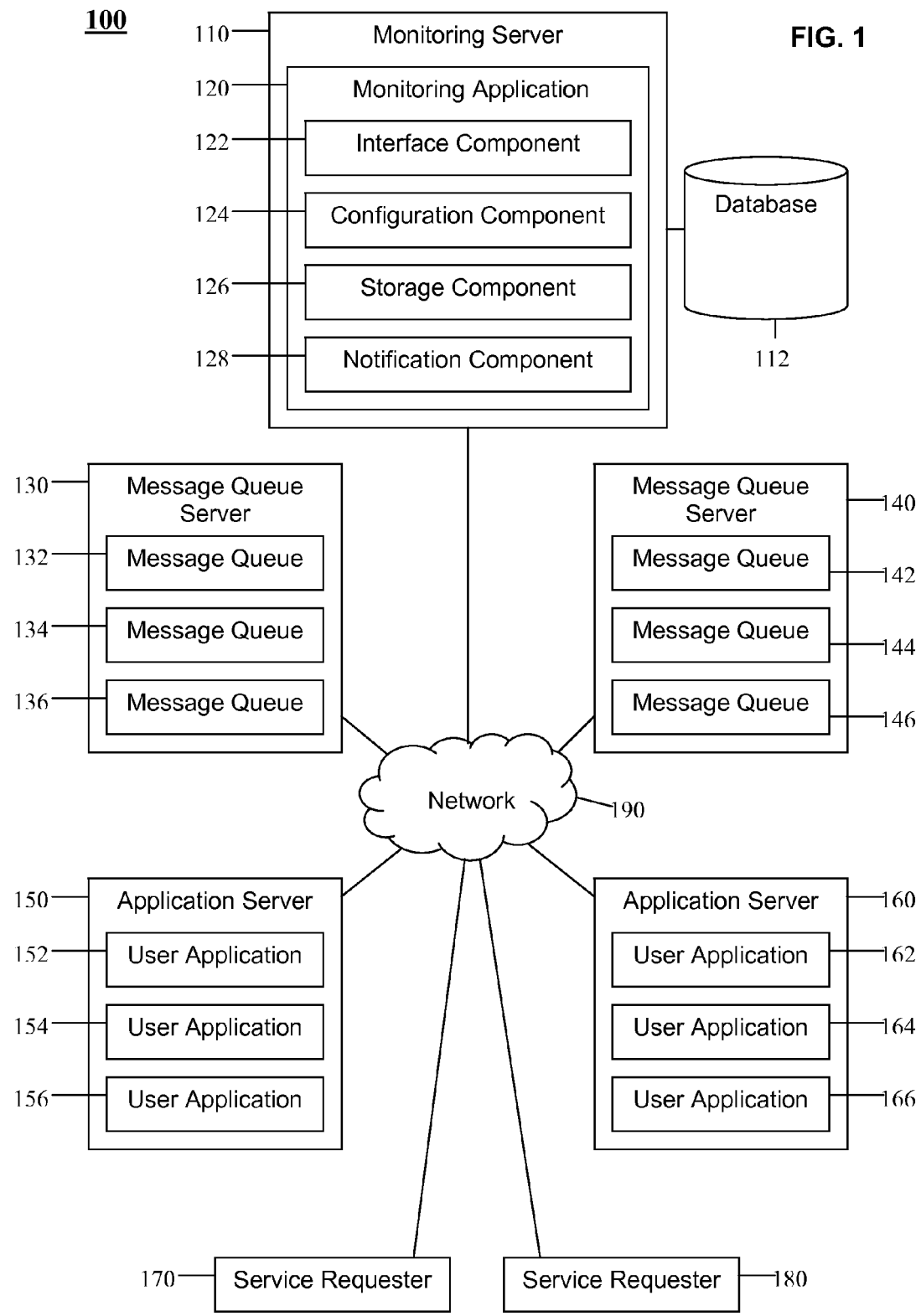
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure provides a system and methods of self-selected message queue monitoring that enable administrators, managers, and users of some applications to select messages and message queues related to the applications for monitoring and exclude non-selected queues from monitoring. The system presents an interface enabling the administrators, managers, and users to choose messaging processes associated with their applications for monitoring. The administrators may specify a metric associated with a messaging process for the applications, for example average message queue volume. In response to the selection of the messaging process and the associated metric, the message queue server that manages the message queue for the selected messaging process periodically captures the metric. The captured metric is placed in a database that the administrator then may access and analyze. Based on analysis of observations of captured information about messaging behavior, the administrator may discover and correct problems or failures exhibited by the application and improve the application's performance.

An enterprise or other entity with a plurality of organizational units may host applications that use message queue servers to receive, store, and forward messages exchanged between and within the applications. The flow of messaging into and out of message queues managed by the message queue servers, during many time periods, may be of little interest to a corporate information technology function, and information about this activity may therefore not be observed or captured by default. There may be no reason to monitor the message queuing metrics associated with the applications' processes if performance or other issues are not raised about the applications. If a need to monitor an application arises from the application exhibiting unacceptable performance, the application team responsible for administering the application may be better suited to address the concern rather than the corporate information technology function, whose resources are primarily dedicated to enterprise-wide data processing matters.

The present disclosure promotes self-registration through an interface and designation of at least one metric measuring a message queue activity of interest. A monitoring server taught herein creates a configuration file associated with the request, and the message queue server associated with the message queue activity of interest reads the configuration file. The message queue server periodically captures the requested message queue metrics and provides them to the monitoring server that stores the information in a database. The application team then may extract the stored information, read and analyze the information, and may take action directed to addressing the concern expressed about the application.

The monitoring application may limit its directions to the message queue servers to capture only the information specifically designated by the administrators of applications that access the interface. The present disclosure teaches the selected capturing of message queue information that administrators, managers, or users expressly designate. Administrators, managers, or users additionally may choose through the interface to be provided notifications when designated metrics associated with specified message queues reach, exceed, or fall below predetermined thresholds. Notifications may be provided using electronic mail, text messaging, telephone messaging, and other methods.

The present disclosure teaches the enabling of multiple application administrators, users, and managers submitting a plurality of types of requests for multiple types of message queue monitoring. The system and methods described herein enable monitoring of a plurality of message queues managed by multiple message queue servers supporting a plurality of applications. The message queue monitoring taught herein may all be registered and coordinated using a common interface and monitoring application.

Turning now to FIG. 1, a system 100 of self-selected message queue monitoring is provided. The system 100 comprises a monitoring server 110, a database 112, a monitoring application 120, message queue servers 130, 140, message queues 132, 134, 136, 142, 144, 146, application servers 150, 160, user applications 152, 154, 156, 162, 164, 166, service requesters 170, 180, and a network 190.

The monitoring server 110 is a computer system. Computer systems are described in detail hereinafter. The monitoring application 120 executes on the monitoring server 110 and enables a plurality of service requesters 170, 180 to self-register for monitoring of designated message queue activity and to select the messaging to be monitored. The service requesters 170, 180 may request monitoring of specific types of messaging activity associated with a plurality of user applications 152, 162 and message queues 132, 142. The requests direct the monitoring application 120 to selectively monitor the messaging activity of the message queues 132, 142 wherein the messaging activity is associated with user applications 152, 162 that the service requesters may use or manage. The monitoring application 120 may command monitoring of only messaging activity specifically requested by service requesters 170, 180 and may not command monitoring of other messaging activity. The service requesters 170, 180 may request the monitoring of the messaging activity associated with user applications 152, 162 that may be exhibiting performance or other problems. By gathering information about and analyzing messaging activity associated with the user applications 152, 162, service requesters 170, 180 may detect and resolve problems observed with the user applications 152, 162.

In an embodiment, the service requester 170 does not select monitoring of all metrics associated with all messaging activity associated with a user application 152. The service requester 170 may instead limit its request to monitoring one metric associated with a single type of message generated by the user application 152 wherein, for example, the selected message type may have been identified as a possible source of a performance problem with the user application 152. The metric associated with the message type may have been selected because the behavior or activity measured by the metric is thought to be related to the performance problem. The message type may be suspected to be a direct cause of the problem, merely an indicator or symptom of the problem, or related to the problem in some other way. After several days, weeks, or months of monitoring of the metric associated with the message type as taught herein, analyzing output produced by the monitoring, concurrently observing behavior of the user application 152, and fielding remarks from users, the service requester 170 may determine the cause of the performance problem and develop a resolution.

The message queue servers 130, 140, and the message queues 132, 134, 136, 142, 144, 146 that they may manage, respectively, store and process messages generated by user applications 152, 154, 156, 162, 164, 166 in their passing of control or content. Message queuing enables the user applications 152, 162 and other components to communicate internally and across networks and systems. User applications 152, 162 send messages to and receive messages from message queues 132, 142. The message queue servers 130, 140 manage application message traffic and other messaging traffic passing through the message queues 132, 142. Messaging may take place within a single user application 152, 162 and be used for inter-process communication or for inter-thread communication within the same process. Messaging may take place between two or more user applications 152, 162 executing on the same computer or between user applications 152, 162 executing on two or more computers. Messaging may take place between user applications 152, 162 executing on a plurality of types of computer systems and other devices, for example mainframe computers, midrange computers, personal computers, and mobile devices. Message queues 132, 142 may temporarily store messages during transmission between the sending user application 152 and the intended recipient user application 162. The message queue servers 130, 140 may manage the flow of messages into the message queues 132, 142, the storage of messages in the message queues 132, 142, and the extraction and forwarding of messages to their destination user applications 152, 162 or other component.

Metrics as used herein are measures of activity of messages associated with user applications 152, 162 or other components that may use message queuing software, message queue servers 130, 140, and message queues 132, 134, 136, 142, 144, 146. A metric chosen for monitoring, for example, may be queue depth, a measure of the quantity of a specified type of message generated, received by, or otherwise associated with the user application 152 stored in the message queue 132 at a specified time. A metric may be a CPU utilization, a memory utilization, or other measurement of load on the message queue server 130, 140. The service requester 170, for example, may request that this metric be measured once every second, once every minute, or once every hour. Metrics may measure a flow of messages through the message queue 132 during a time period instead of a static count of messages stored in the message queue 132 at a specified time. Metrics may measure the quantity of messages entering the message queue 132, exiting the message queue 132, or exhibiting some other measurable behavior. Metrics may measure messaging latency that may be an observed problem or be an indicator of an observed problem. Metrics also may measure activity within an operating system or within hardware or firmware of a single computer, such as processor or memory utilization.

An organization, such as a commercial enterprise, government body, or university system, may use hundreds or more user applications 152, 162. The user applications 152, 162 may be deployed globally across the organization, may be used in a region or division, or may be limited to a department with several locations or a single location. Message queue servers 130, 140 may receive, store, and transmit to their destinations messages transmitted between computers, messages between user applications 152, 162, messages within user applications 152, 162, and messages within and between instances of operating systems. An organization with many user applications 152, 162 may have thousands or millions of such messages exchanged during a time period, for example a day or an hour. The organization may not track or measure the flow of messages through the large quantity of message queues 132, 142 because there may be no reason to do so. Tracking millions of messages per day through thousands of message queues 132, 142 may have no technical or economic justification, particularly if performance of the user applications 152, 162 is deemed acceptable. The information technology function of a large organization may leave the determination to the users and the administrators of user applications 152, 162 as to whether a user application 152 is functioning correctly and with satisfactory performance. The organization, therefore, as a matter of policy and practicality, may not observe, collect, track, or measure message queuing activity related to user applications 152, 162 flowing through message queues 132, 142 unless requested.

The present disclosure enables administrators of user applications 152, 162, hereinafter service requesters 170, 180, to self-register through an interface provided by the monitoring application 120. The interface may be provided in web browser format, and the user of the service requester 170 may be provided with an account identification and credential for future use. The monitoring application 120 enables the service requester 170 to self-select a user application 152 over which the service requester 170 has authority or administrative rights and to designate a message queue 132 used by the user application 152. An instance of the user application 152 may use the message queue 132 for exchanging messages with other instances of the same user application 152 executing on other computers or with other user applications 154, 156, 162, 164, 166. Components within a single instance of the user application 152 also may exchange messaging through the message queue 132. The service requester 170 may designate a message type and associated metric for the message type in addition to designating the message queue 132. The message type may depend on the transmitting user application 152, the receiving user application 162, and the nature and function of the message itself. The metric associated with the message may be a measure of activity associated with the message and the message queue 132, such as the average quantity of messages passing through the message queue 132 per second, per minute, or per hour, for example. The metric may be a static measure, perhaps the average number of messages stored in the message queue at a defined time of day or under a defined condition.

The service requester 170 may seek information about the requested metric associated with the messages because the metric, as a measure of activity or status, particularly when a number of observations are made of the metric, may provide indications or insight to the service requester 170 about a problem with the user application 152 that generates, receives, or otherwise has contact with the messages. Depending on the nature of the problem observed and the type of messages that are subject to monitoring, the service requester 170 may request to have data about the metric captured a plurality of times. Capturing a plurality of observations of the metric may promote the service requester 170 to make determinations about patterns of behavior by the user application 152 and may suggest further analysis and investigation to discover the root causes of an observed failure or performance issue. The service requester 170, in submitting its monitoring request to the monitoring application 120, may request repeated observations of the metric over an extended period, for example several days or weeks, in order to establish a pattern and to have statistically significant information upon which to base conclusions and justification for action.

The present disclosure enables a plurality of types of service requesters 170, 180 to request message queue monitoring of various types for a plurality of reasons. Such reasons may comprise investigating suspected or potential problems or addressing known problems with the user application 152, improving the performance of the user application 152, and monitoring usage of the user application 152 to determine whether to make changes to the user application 152, for example to broaden its popularity or exposure or to reduce or discontinue its availability altogether. The present disclosure enables the monitoring of a plurality of message types processed through a plurality of message queues 132, 134, 136, 142, 144, 146 managed by a plurality of message queue servers 130, 140. These activities may all be registered with the common user interface available to qualified service requesters 170, 180 and coordinated by the monitoring application 120 as described herein.

When the service requester 170 submits a request for message queue monitoring to the monitoring application 120, the monitoring application 120 reviews the request and information about the service requester 170. Assuming the monitoring application 120 approves the request, the monitoring application 120 then creates a configuration file describing the request. The configuration file may list the identity of the service requester 170, the user application 152 generating the message of interest, the specific message of interest or message type of interest that is to be monitored, the metric associated with the message that is to be captured, and the frequency of capturing the metric. The message may be designated with a code, a message type or name, or by another convention. The metric is a measurement associated with the flow of a volume of messages of the selected message type, for example frequency of occurrence during a period of time, or a counted number or quantity of the messages at a specified time. The monitoring application 120 may examine records associated with the user applications 152, 162 and determine the identity of the message queue server 130 that hosts or otherwise manages the message queue 132 through which the message of interest passes. The monitoring application 120 adds coding or other information identifying the message queue server 130 into the configuration file to accompany the other information describing the request for message queue monitoring.

In an embodiment, the service requester 170 does not know and therefore may be unable to identity the message queue 132 or message queue server 130 used by the message of interest associated with the user application 152. The message whose behavior the service requester 170 seeks to investigate, at various times and for various reasons, may use a different message queue 142 managed by a different message queue server 140. The monitoring application 120 may determine the message queue 132, 142 and the message queue server 130, 140 used by the user application 152 and relieve the service requester 170 of the task of determining this information. To accomplish this, the monitoring application 120 may send inquiries to message queue servers 130, 140 requesting the message queue server 130, 140 managing the message queue 132, 134, 136, 142, 144, 146 processing or storing the message of interest to identify itself and provide coding or other identification of the message queue 132, 142 involved and the message or message type. The monitoring application 120 may request the message queue server 130 that identifies itself as handling the message to provide an identifying designation of the message of interest or message type for use by the monitoring application 120 during the duration of the message queue monitoring. This may be helpful if during the message queue monitoring the message queue server 130, 140 and/or message queue 132, 142 handling the message should change for any reason. The monitoring application 120, alternatively or in addition to querying message queue servers 130, 140 about their management of specific messages related to user applications 152, 162, may send inquiries to the application servers 150, 160 that host the user applications 152, 162. These inquiries may request identification of the message of interest and/or request identification of the message queue server 130, 140 or message queue 132, 142 involved if the application server 150, 160 is able to provide this information. The monitoring application 120 also may send similar queries to other intervening devices that handle or forward messages such as routers or mail servers.

When the monitoring application 120 creates the configuration file for the newly received request for message queue monitoring, it also creates a table in the database 112 dedicated to the request. When data is later captured in response to the request, the data is stored in the table in the database 112. The service requester 170 that submitted the request may then access the captured data from the database 112.

The monitoring application 120 creates a configuration file for each message queue monitoring request received. The message queue servers 130, 140 periodically contact the monitoring server 110 to determine if any newly created configuration files contain coding associated with the message queue servers 130, 140. When the message queue server 130 accesses the monitoring server 110 and scans the posted configuration files, the message queue server 130 may search specifically for configuration files containing coding indicating that at least one of the message queues 132, 134, 136 managed by the message queue server 130 is involved in requests documented in the configuration files. The message queue server 130 may determine from the coding that a request has been submitted for message queue monitoring for one of the message queues 132, 134, 136 that it manages. The message queue server 130 then may analyze the request documented in the configuration file and follow the instructions regarding the message to be monitored that passes through the message queue 132, the metric to be captured, and the frequency with which the message queue activity is to be observed, measured, and stored in the database 112 for access by the service requester 170.

The message queue servers 130, 140 periodically access the monitoring server 110 or another component for newly posted configuration files describing newly received message queue monitoring requests from service requesters 170, 180. The message queue servers 130, 140 also may examine previously posted configuration files that may contain changes to previously received message queue monitoring requests. In an embodiment, the service requester 170 may seek an adjustment to a previously submitted request. The service requester 170, for example, may request a different frequency of capturing of the metric. The message queue servers 130, 140 also may examine the previously posted configuration files to determine when service requesters 170, 180 have requested that a previously submitted message queue monitoring request is to be discontinued.

The message queue server 130 accesses the monitoring server 110 or associated component to examine newly posted and previously posted configuration files containing new monitoring requests and changes to previously received monitoring requests. When the message queue server 130 determines that a newly posted configuration file contains a monitoring request related to messaging passing through a message queue 132 associated with the message queue server 130, the message queue server 130 may begin the monitoring of messaging associated with the message queue 132 as described in the request. The type and frequency of the monitoring done by the message queue server 130 depends on the type of user application 152, the type of messaging to be monitored, and the associated metric to be captured. The monitoring may also depend on the frequency with which the service requester 170 has asked for the captured metric information to be made available for the service requester 170 to view.

In an embodiment, some of the interactions between the message queue servers 130, 140 and the monitoring application 120 that previously have been described as primarily initiated and carried out by the message queue servers 130, 140 instead may be handled by the monitoring application 120. For example, instead of the monitoring application 120 posting configuration files and the message queue servers 130, 140 periodically contacting the monitoring server 110 to check for the presence of newly posted or updated configuration files, the reverse may occur wherein the monitoring server 110 sends notifications to the message queue servers 130, 140 of the availability of newly posted or updated configuration files. In addition, instead of the message queue servers 130, 140 reading the information from the configuration files, the monitoring server 110 may push the information to the message queue servers 130, 140 in their notifications or in other transmissions. When the message queue servers 130, 140 have gathered monitoring information in response to requests provided by service requesters 170, 180, instead of the message queue servers 130, 140 forwarding or posting the monitoring information to the database 112, the monitoring server 110 may retrieve this information from the message queue servers 130, 140 and handle the tasks itself of posting the monitoring information to the database 112. When requested monitoring is to be discontinued, instead of the message queue servers 130, 140 contacting the monitoring server 110 to determine the occurrence of these events, the monitoring server 110 may instead send notifications of these events to the message queue servers 130, 140.

By having the monitoring application 120 handle some or many of these tasks as described in this alternative embodiment, processing burden may be relieved from the message queue servers 130, 140 that may handle tasks unrelated to message queue management. In addition, network traffic may be reduced when transmissions between the monitoring server 110 and the message queue servers 130, 140 may be scheduled to take place during periods of reduced traffic, such as at night and on weekends. The interactions between the monitoring server 110 and the message queue servers 130, 140 regarding this alternative embodiment may be impacted by considerations of access permissions required by the message queue servers 130, 140. In an embodiment, a large quantity of message queue servers 130, 140 may be in service, and configuring and maintaining access permissions to each message queue server 130, 140 for the monitoring server 110 may be labor intensive and not economically practical.

In an embodiment, the metric may be a measure of queue depth of the message queue 132, wherein queue depth is expressed as the quantity of messages stored in the message queue 132 at a defined time or times. The metric may alternatively be a measure of message volume entering the message queue 132 or message volume exiting the message queue 132 during a predetermined time period such that volume is expressed as a rate, for example quantity of messages per second or per minute. Measures of messaging activity may be observed and expressed as per unit of time, for example as an average volume per second, per minute, or per hour.

When the metric is a measure of a volume of messages into or exiting the message queue 132 during a period of time and therefore may be expressed as a rate, the rate may be implicit such that it may be determined based on a plurality of observations. The present disclosure does not suggest that the message queue server 130 embodies functionality that measures speed per se of messages entering or exiting the message queue 132 at the moment that this activity occur. By contrast, the quantity of messages, for example, that were observed to have entered the message queue 132 during a twenty four hour period may be counted. That counted quantity may be later divided by 86,400 (the number of seconds in a twenty four hour day), to determine the average number of messages passing through the message queue 132 per second on that day. While this measure may not meet the exact definition of rate, the measure or average rate may be satisfactory and useful in meeting the purposes of the service requester 170 in analyzing a performance problem of the user application 152, 162, particularly if a plurality of such metrics are captured for consecutive days or weeks and then subjected to analysis.

Measures of messaging activity also may be observed and expressed as per monitoring period. The monitoring period may be defined by the service requester 170. In an example, the service requester 170 may be associated with the administrator of the user application 152. Users of the user application 152 may complain that performance of the user application 152 appears to suffer in the late afternoon. The service requester 170 may submit a request for monitoring of messages associated with the user application 152 that flow through message queues 132, 134. In the example, the service requester 170 may not know the message queues 132, 134 used by the messages associated with the user application 152 and the monitoring application 120 may determine this information. The monitoring application 120, for example, may instruct the message queue server 130 to monitor the message queue 132 between the late afternoon hours of 3:30 PM and 5:30 PM. Examination and analysis of the monitoring results may permit detection of problems causing the poor performance associated with late afternoon usage. After analyzing information about one or more of the requested metrics associated with messaging activity generated by the user application 152, the service requester 170 may identify a problem with the user application 152 that may be addressed and resolve the reported performance problem.

The message queue server 130 may create one or more scheduled tasks to run to perform the monitoring and capturing of the metric as requested. Additionally, the scheduled tasks may comprise instructions for how the captured metric information is to be packaged and transmitted to the database 112. In an embodiment, the information may be pushed by the message queue servers 130, 140 to the database 112 via the monitoring server 110. In an embodiment, the monitoring application 120 may contact the message queue servers 130, 140, pull the captured information from the message queue servers 130, 140, and store the captured information in the database 112. In an embodiment, the captured information may pass from the message queue servers 130, 140 to the database 112 without involvement of the monitoring server 110 or the monitoring application 120.

The information captured by the message queue servers 130, 140 about the monitored messaging and associated metrics is stored in the database 112 in tables created by the monitoring application 120 for requests submitted by the service requesters 170, 180. The service requesters 170, 180 may be given various levels of access to the information depending on their permission levels. In an embodiment, the service requesters 170, 180 may comprise components associated not with administrators of the user applications 152, 162 but with other roles, such as managers, executives, internal auditors, and outside parties such as customers, vendors, and service providers. The captured information may be stored in the database 112 for a predetermined time period and may then be deleted or otherwise removed from the database 112.

The present disclosure teaches the monitoring application 120 arranging for monitoring of message queues associated with user applications 152, 162 upon the self-registration by service requesters 170, 180. Other than system and transmit queues, the monitoring application 120 by default may limit queue monitoring to those requested by service requesters 170, 180 and may not otherwise monitor message queue activity. If service requesters 170, 180 do not express an interest in message queue activity, the monitoring application 120 by default may not direct the message queue servers 130, 140 to perform queue monitoring as described herein.

The service requester 170 may submit a request for message queue monitoring wherein, instead of application messaging information being gathered and stored, the service requester 170 receives a notification when a designated metric crosses a predetermined threshold, either by exceeding or falling below the threshold. The service requester 170, for example, may request to receive a notification when queue depth for the message queue 132 exceeds a predetermined level. The message queue server 130 managing the message queue 132 through which the messages associated with the metric flow may activate a task that sends the notification when the threshold is crossed. The notification may be sent to the service requester 170 using a plurality of methods that may comprise electronic mail messaging, short message service (SMS) messaging, also known as text messaging, telephone voice messaging, or via popup message on the monitor of the service requester 170. In an embodiment, the service requester 170 may request to be notified if any of a plurality of designated metrics associated with messaging crosses a predetermined threshold.

The application servers 150, 160 host the user applications 152, 154, 156, 162, 164, 166. In an embodiment, the application servers 150, 160 may share processing of some user applications 152, 154, 156, 162, 164, 166. In an embodiment, elements or components of the user applications 152, 154, 156, 162, 164, 166 may execute on other hardware components, for example on the service requesters 170, 180 or on other client devices. In an embodiment, the application servers 150, 160 may execute on the same hardware component as the monitoring server 110 and the message queue servers 130, 140.

The database 112 stores information captured by the message queue servers 130, 140 and accessed by the service requesters 170, 180 as described herein. Although FIG. 1 depicts the database 112 as attached to the monitoring server 110, in embodiments the database 112 may be accessible directly via the network 190.

The network 190 promotes communication between the components of the system 100. The network 190 may be any communication network including a public data network (PDN), a public switched telephone network (PSTN), a private network, and/or a combination thereof.

In an embodiment, the monitoring application 120 may be subject to policies that cause the discontinuation of requested message queue monitoring after a predetermined period of time or upon the meeting of another condition. Some types of message queue monitoring may generate a significant quantity of data in a short time and may occupy increasing amounts of storage space in the database 112. A service requester 170 may not specify an end date for message queue monitoring and the monitoring application 120 may continue gathering and storing captured information in the database 112. The monitoring application 120 may delete some message queue information stored in the database 112 after a predetermined time period, particularly if the service requester 170 has not accessed the information or otherwise shown an interest in viewing the information. The service requester 170, for example, may have received the answer or solutions sought and simply forgotten to discontinue the monitoring. The application administrator, user, or manager associated with the service requester 170, for example, may have lost interest in the message queue monitoring for any of a plurality of reasons. To remedy such situations and circumvent the potential problem of the database 112 becoming burdened with backdated and unwanted information, the monitoring application 120 may provide a notification to the service requester 170 in the user interface upon initial registration for message queue monitoring. The notification may state that requested monitoring will be discontinued after a predetermined time period, for example a week, two weeks, or a month, unless the service requester 170 expressly requests continuation. The monitoring application 120 may send electronic mail messages or other notifications to the service requester 170 that expiration is nearing and may provide the service requester 170 the opportunity to click on a link or otherwise elect continuation of monitoring. These actions may reduce unnecessary accumulation of message queue monitoring information in the database 112.

The monitoring application 120 comprises the interface component 122 that presents a user interface to service requesters 170, 180 seeking to initiate message queue monitoring as described herein. The present disclosure teaches that service requesters 170, 180 are empowered to self-register for monitoring of message queues 132, 142 selected by the service requesters 170, 180 with the monitoring application 120 by default not monitoring other message queues 132, 142. The message queues 132, 142 and their messaging traffic in which the service requesters 170, 180 are interested receive monitoring by the monitoring application 120. Other queue servers 130, 140, and other message queues 134, 136, 144, 146 carrying message traffic not of interest to the service requesters 170, 180 may be not monitored by the monitoring application 120. The interface component 122 authorizes service requesters 170, 180 that are first time users of message queue monitoring taught herein to receive an account identification that they use each time thereafter. The service requesters 170, 180 are then enabled to self-register for monitoring of message queuing of messages associated with user applications 152, 162 over which the service requesters 170, 180 have authority or other access rights. The interface component 122 promotes the entry of the identification of the user application 152 involved, the entry of the message of interest, and the description of the metric associated with the message. The interface component 122 also may provide an input to choose how often and when the metric is to be captured and how often and in what manner the captured metric information is to be stored in the database 112. Service requesters 170, 180, when entering requests for message queue monitoring, may be requested to enter a role. Service requesters 170, 180 make entries into the interface provided herein and by default may not be permitted to modify message queue servers 130, 140 or message queues 132, 142.

The monitoring application 120 also comprises the configuration component 124 that processes the information received by the interface component 122 and creates a configuration file that describes the request for message queue monitoring. The configuration file is accessed and read by the message queue servers 130, 140. The message queue servers 130, 140 determine whether newly posted configuration files contain requests for monitoring that may involve message queues 132, 142 managed by the message queue servers 130, 140. When the message queue server 130 reads a configuration file containing a request that involves a user application 152 transmitting messaging through a message queue 132 managed by the message queue server 130, the message queue server 130 analyzes the contents of the configuration file and may create a task. The task describes the user application 152, the message to be tracked, the metric measuring the message that is to be captured, the frequency with which the metric is to be captured, and the frequency with which the captured information is to be stored in the database 112.

The configuration component 124 also modifies previously created and posted configuration files when service requesters 170, 180 contact the monitoring application 120 to change requests associated with the configuration files. In an embodiment, a service requester 170 may seek to change some aspect of a previously submitted request, for example the frequency of capturing the metric associated with the message. The service requester 170 may access the interface component 122 and enter a request to modify a previously submitted and currently effective request. The service requester 170 may be presented another screen view or interface wherein the service requester 170 may make the desired adjustment. When the message queue servers 130, 140 subsequently access on the predetermined periodic basis the monitoring application 120 or other component to read newly posted configuration files as well as previously posted configuration files that have been modified in some manner, the message queue server 130 that determined earlier that the configuration file was its responsibility will detect that it has been modified. The message queue server 130 will examine the modified configuration file and may modify its associated task in accordance with the change documented in the configuration file.

The configuration component 124 also modifies previously posted configuration files when service requesters 170, 180 contact the monitoring application 120 requesting that a previously entered request be closed and associated message queue monitoring discontinued. As with cases of configuration files receiving modifications when previously received requests are changed, when the message queue servers 130, 140 conduct their periodic review of configuration files, the message queue server 130 reading a configuration file for which it has been previously performing message queue monitoring detects when a request has been entered for the monitoring to be discontinued. The message queue server 130 modifies its currently executing task so that message queue monitoring is discontinued as described by the service requester 170.

The monitoring application 120 also comprises the storage component 126 that stores metric measurement data and other captured information in the database 112 for review by the service requesters 170, 180. When a request for message queue monitoring is initially received from a service requester 170, and the request is approved by the monitoring application 120, in addition to creating a configuration file, the monitoring application 120 also creates a table in the database 112. The table is used for storing the captured information associated with the request. The table may be configured to store the information for a predetermined time period, after which the information may be deleted.

The monitoring application also comprises the notification component 128 that notifies service requesters 170, 180 of various events associated with the interactions of the components of the system 100. The service requester 170 may enter a request through the user interface to receive notification when a threshold associated with a message queue 132, 142 is reached or crossed. In such an event, the notification component 128 may notify the service requester 170 using at least one of a plurality of methods comprising electronic mail, short message service (SMS) message, pager alert, computer popup alert message, and telephone call. The service requester 170 also may enter a request to receive a notification when any one of a plurality of designated metrics cross predetermined thresholds. The notification component 128 may also activate to notify the service requester 170 that captured information has been stored in the database 112 as taught herein.

Figure 2:
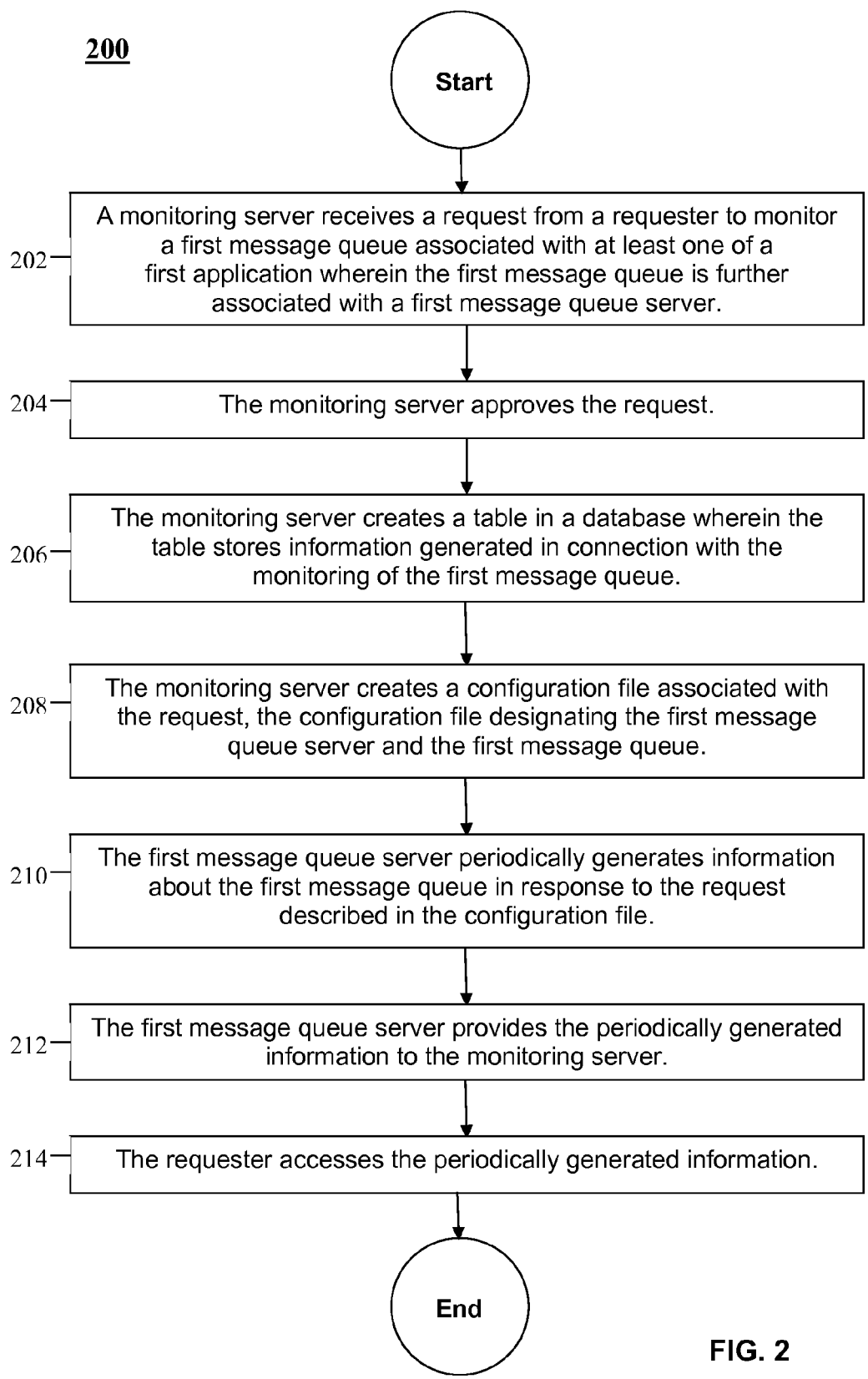
FIG. 2 is a flow chart illustrating a method according to an embodiment of the disclosure.

Turning now to FIG. 2, a processor implemented method 200 is provided. Beginning at block 202, a monitoring server receives a request from a requester to monitor a first message queue associated with at least one of a first application wherein the first message queue is further associated with a first message queue server. At block 204, the monitoring server approves the request.

At block 206, the monitoring server creates a table in a database wherein the table stores information generated in connection with the monitoring of the first message queue. At block 208, the monitoring server creates a configuration file associated with the request, the configuration file designating the first message queue server and the first message queue.

At block 210, the first message queue server periodically generates information about the first message queue in response to the request described in the configuration file. At block 212, the first message queue server provides the periodically generated information to the monitoring server. At block 214, the requester accesses the periodically generated information.

Figure 3:
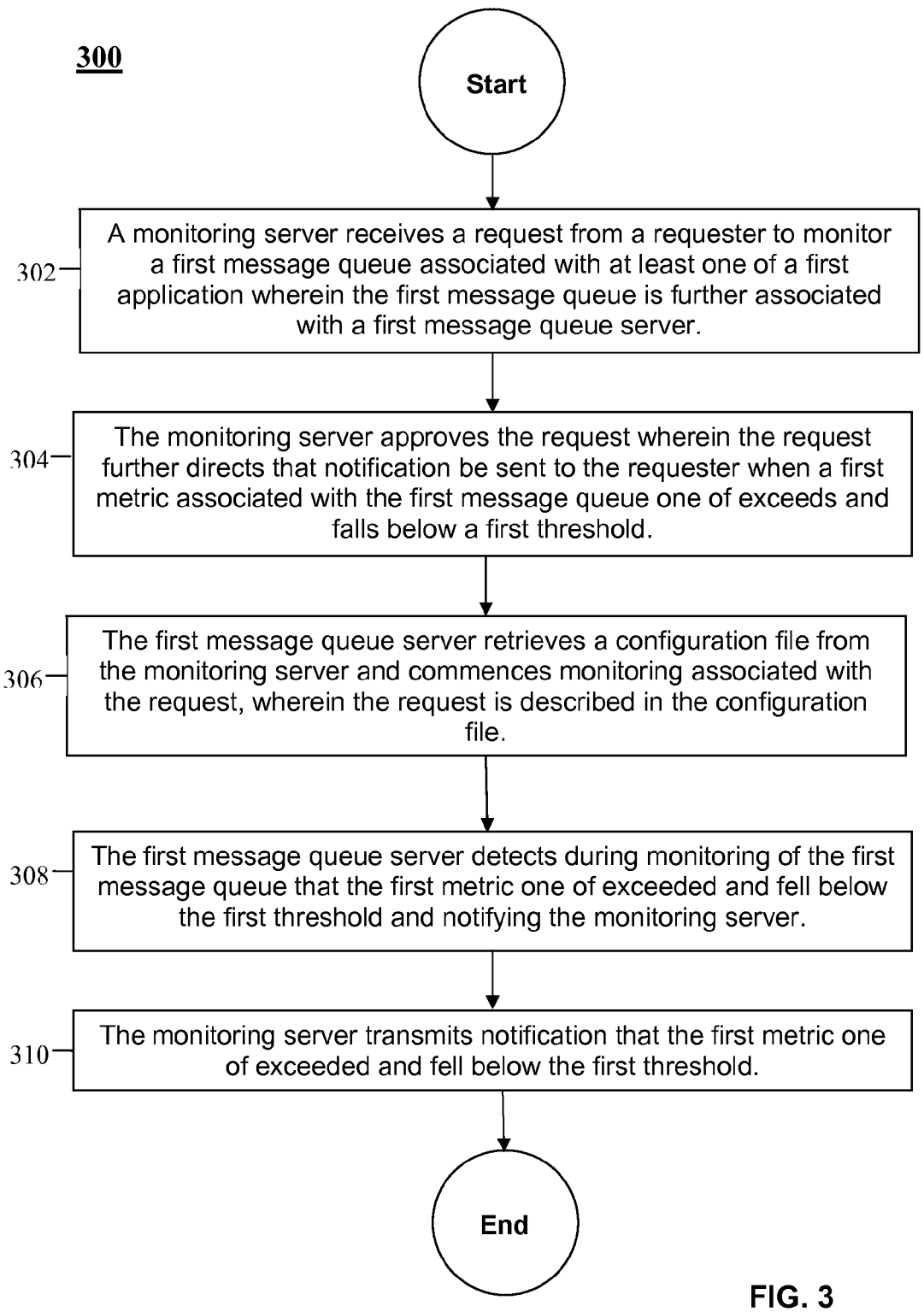
FIG. 3 is a flow chart illustrating a method according to an embodiment of the disclosure.

Turning now to FIG. 3, a processor implemented method 300 is provided. Beginning at block 302, a monitoring server receives a request from a requester to monitor a first message queue associated with at least one of a first application wherein the first message queue is further associated with a first message queue server. At block 304, the monitoring server approves the request wherein the request further directs the requester receiving notification when a first metric associated with the first message queue one of exceeds and falls below a first threshold.

At block 306, the first message queue server retrieves a configuration file from the monitoring server and commences monitoring associated with the request, wherein the request is described in the configuration file. At block 308, the first message queue server detects during monitoring of the first message queue that the first metric one of exceeded and fell below the first threshold and notifying the monitoring server. At block 310, the monitoring server transmits notification that the first metric one of exceeded and fell below the first threshold.

Figure 4:
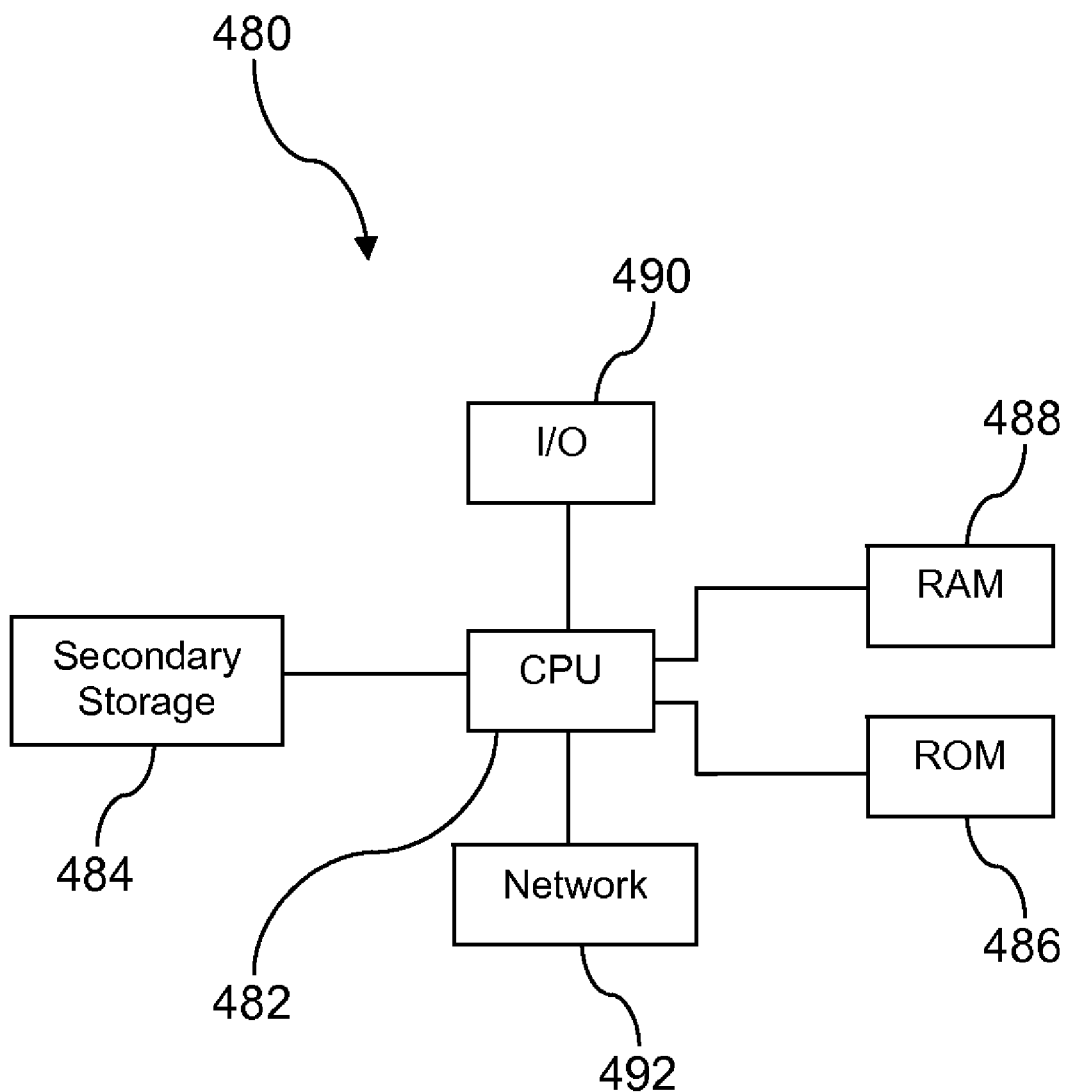
FIG. 4 illustrates an exemplary computer system suitable for implementing some aspects of the several embodiments of the disclosure.

FIG. 4 illustrates a computer system 480 suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) devices 490, and network connectivity devices 492. The processor 482 may be implemented as one or more CPU chips.

It is understood that by programming and/or loading executable instructions onto the computer system 480, at least one of the CPU 482, the RAM 488, and the ROM 486 are changed, transforming the computer system 480 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 484 is typically comprised of one or more disk drives or tape drives and is used for non-volatile storage of data and as an over-flow data storage device if RAM 488 is not large enough to hold all working data. Secondary storage 484 may be used to store programs which are loaded into RAM 488 when such programs are selected for execution. The ROM 486 is used to store instructions and perhaps data which are read during program execution. ROM 486 is a non-volatile memory device which typically has a small memory capacity relative to the larger memory capacity of secondary storage 484. The RAM 488 is used to store volatile data and perhaps to store instructions. Access to both ROM 486 and RAM 488 is typically faster than to secondary storage 484. The secondary storage 484, the RAM 488, and/or the ROM 486 may be referred to in some contexts as non-transitory storage and/or non-transitory computer readable media.

I/O devices 490 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 492 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 492 may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity devices 492 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492. While only one processor 482 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 484, for example, hard drives, floppy disks, optical disks, and/or other device, the ROM 486, and/or the RAM 488 may be referred to in some contexts as non-transitory instructions and/or non-transitory information.

In an embodiment, the computer system 480 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 480 to provide the functionality of a number of servers that is not directly bound to the number of computers in the computer system 480. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 480, at least portions of the contents of the computer program product to the secondary storage 484, to the ROM 486, to the RAM 488, and/or to other non-volatile memory and volatile memory of the computer system 480. The processor 482 may process the executable instructions and/or data in part by directly accessing the computer program product, for example by reading from a CD-ROM disk inserted into a disk drive peripheral of the computer system 480. The computer program product may comprise instructions that promote the loading and/or copying of data, data structures, files, and/or executable instructions to the secondary storage 484, to the ROM 486, to the RAM 488, and/or to other non-volatile memory and volatile memory of the computer system 480.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A self-selected message queue monitoring system, comprising:
    a processor;
    a memory; and
    an application stored in the memory that, when executed by the processor,
    presents an interface to a requester enabling self-registration for selection of monitoring of one or more messages of a particular message type selected from a plurality of message types from one or more message queues of a plurality of message queues associated with one or more user applications of a plurality of user applications,
    receives a message completing self-registration for monitoring, the message selecting monitoring of the one or more messages of the particular message type from the one or more message queues associated with the one or more user applications,
    authorizes the requester to access periodically collected information about the one or more messages of the particular message type from the one or more message queues,
    determines, at a predetermined time, a first metric associated with the one or more messages of the particular message type from the one or more message queues, wherein the first metric is specified in the message completing self-registration, wherein the first metric is a measure of one of queue depth of the particular message type of the one or more message queues, volume of the particular message type entering the one or more message queues, and volume of the particular message type exiting the one or more message queues, and wherein the measure is observed one of per unit of time and per monitoring period, and
    stores the first metric for access by the requester.

2. The system of claim 1, wherein the first metric is calculated on a periodic basis of at least on one of a daily and weekly basis.

3. The system of claim 1, wherein the plurality of message queues are used for inter-process communication and inter-thread communication within the same process.

4. The system of claim 1, wherein the plurality of message queues are used for communication within the one or more user applications and between the one or more user applications and another user application of the plurality of user applications.

5. The system of claim 4, wherein the one or more user applications and the other user application are used on at least one of an enterprise, a divisional, and a departmental basis.

6. The system of claim 1, wherein the requester is associated with an administrator for the one or more user applications.

7. The system of claim 1, wherein the application creates an account and establishes an account identification a single time for the requester and wherein the requester self-registers upon each instance of requesting monitoring of the one or more message queues and another message queue.

8. The system of claim 1, wherein the particular message type depends on at least one of a transmitting user application, a receiving user application, and a nature and a function of a message itself.

9. A processor-implemented method of queue monitoring, comprising:
    a monitoring server receiving a request from a requester to monitor one or more messages of a particular message type selected from a plurality of message types from one or more message queues associated with least one or more applications wherein the one or more message queues is further associated with a first message queue server;
    the monitoring server approving the request;
    the monitoring server creating a table in a database wherein the table stores information generated in connection with the monitoring of the one or more message queues;
    the monitoring server creating a configuration file associated with the request, the configuration file designating the first message queue server and the one or more message queues;
    the first message queue server periodically generating information about the one or more messages of the particular message type from the one or more message queues in response to the request described in the configuration file, wherein the information comprises a metric, wherein the metric is a measure of one of queue depth of the particular message type of the one or more message queues, volume of the particular message type entering the one or more message queues, and volume of the particular message type exiting the one or more message queues, and wherein the measure is observed one of per unit of time and per monitoring period;
    the first message queue server providing the periodically generated information to the monitoring server; and
    the requester accessing the periodically generated information.

10. The method of claim 9, wherein the monitoring server creates the table in the database for each approved request for monitoring.

11. The method of claim 9, wherein the request to monitor the one or more message queues comprises a request to collect information about the metric measuring an activity associated with the one or more message queues, and wherein the configuration file further describes the metric measuring the activity associated with the one or more message queues and describes a frequency of capturing the metric.

12. The method of claim 9, wherein the first message queue server periodically contacts the monitoring server for a plurality of configuration files describing monitoring requests for information about message queue activity associated with the first message queue server.

13. The method of claim 12, wherein the configuration files one of describe newly received requests for monitoring of message queues and describe changes to previously received requests for monitoring of message queues.

14. The method of claim 12, wherein the changes to previously described requests for monitoring of message queues comprise adjustments to previously received requests and discontinuations of previous requests.

15. The method of claim 9, wherein the request to monitor the one or more message queues is alternatively associated with messaging activity generated by at least one instance of an operating system.

16. The method of claim 9, wherein the first message queue server does not collect information about metrics not described in requests to monitor message queues.

17. A processor-implemented method of queue monitoring, comprising:
a monitoring server receiving a request from a requester to monitor one or more messages of a particular message type selected from a plurality of message types from one or more message queues associated with one or more applications wherein the one or more message queues is further associated with a first message queue server;
the monitoring server approving the request, wherein the request further directs that notification be sent to the requestor when a first metric associated with the one or more message queues one of exceeds and falls below a first threshold, wherein the first metric is a measure of one of queue depth of the particular message type of the one or more message queues, volume of the particular message type entering the one or more message queues, and volume of the particular message type exiting the one or more message queues, and wherein the measure is observed one of per unit of time and per monitoring period;
the first message queue server retrieving a configuration file from the monitoring server and commencing monitoring associated with the request, wherein the request is described in the configuration file;
the first message queue server detecting during monitoring of the one or more message queues that the first metric one of exceeded and fell below the first threshold and notifying the monitoring server; and
the monitoring server transmitting notification that the first metric one of exceeded and fell below the first threshold.

18. The method of claim 17, wherein the monitoring server provides the requester an option to receive notification in the event a designated metric associated with any of a plurality of designated message queues at least one of exceeds and falls below a predetermined threshold.

19. The method of claim 17, wherein the monitoring server notifies the requester using at least one of a plurality of methods comprising electronic mail, short message service (SMS) message, pager alert, computer popup alert message, and telephone call.

* * * * *